June 23, 1970 D. M. CHAPIN Re. 26,918

MULTIBIT MAGNETIC TRANSDUCER

Original Filed Jan. 30, 1961

INVENTOR
D. M. CHAPIN
BY
R. C. Winter
ATTORNEY

United States Patent Office

Re. 26,918
Reissued June 23, 1970

26,918
MULTIBIT MAGNETIC TRANSDUCER

Daryl M. Chapin, Basking Ridge, N.J., assignor to Bell Telephone Laboratories, Incorporated, New York, N.Y., a corporation of New York Original No. 3,196,450, dated July 20, 1965, Ser. No. 85,821, Jan. 30, 1961. Application for reissue Dec. 8, 1966, Ser. No. 612,743
Int. Cl. G11b *5/02, 5/20*
U.S. Cl. 346—74 9 Claims

Matter enclosed in heavy brackets [ ] appears in the original patent but forms no part of this reissue specification; matter printed in italics indicates the additions made by reissue.

*ABSTRACT OF THE DISCLOSURE*

*A multiple gap magnetic recording head for recording, in serial order on magnetic tape, data received in parallel form. The recording head comprises n laminations of magnetic material arranged such that one end of each joins at the vertex of a V-shaped structure to define n—1 parallel and closely-spaced signal translating gaps. The laminations fan out, substantially equally-spaced apart, toward the open end of the V-shaped structure. Individual signal translating windings for each gap are located between each adjacent pair of laminations at the open end of the V-structure.*

This invention relates to magnetic recording and reproducing, and more particularly, to magnetic record transducers and to methods for their manufacture.

Magnetic mediums are commonly used in the communications and data processing fields for the storage of pulse and digital information in the form of magnetic patterns. These magnetic patterns are normally arranged in channels, or tracks, along the surface of the magnetic medium; and in any one track, the information is further arranged in successive binary digit or bit positions. The recordation of the information is accomplished through the impartation of relative motion between the magnetic track and a record transducer, each bit of information being recorded sequentially in successive bit positions along the magnetic track. Subsequently, the recorded information may be reproduced by a read transducer, which senses the bit positions sequentially to provide the bits of information serially to appropriate utilization circuitry, e.g., data processing equipment or data transmission apparatus.

As long as the bits of information to be recorded are available in serial order, the recordation thereof may be accomplished relatively simply by the sequential presentation of successive bits to a conventional record transducer. However, the ever-increasing use of pulse codes in communication and data processing equipment gives rise to consideration of the possibilities of recording the bits of information when they are not available in serial order. The information to be recorded, for example, may be in the form of binary coded words representing various numbers, letters and symbols, each word comprising a plurality of bits of information presented simultaneously, i.e., in parallel form, to be recorded serially on a magnetic track. A conventional magnetic record transducer can accept and record only one bit of information at a time. Therefore, in such pulse code systems, and in other systems wherein a plurality of bits of information are presented concurrently to be recorded in serial order, it has been the practice heretofore to perform some intermediate conversion operation. For example, in the prior art, the bits have been temporarily stored in a register and shifted out for recording, one bit at a time. The intermediate storage operation, of course, requires additional circuitry and additional manipulation of the information, resulting in greater recording circuit size and complexity and in increased cost and chance for error to be introduced.

Accordingly, it is a general object of this invention to eliminate the need for intermediate storage or conversion of parallel data for serial recording on a magnetic track.

It is a more specific object of this invention to provide a magnetic transducer for recording concurrently presented bits of information in serial order along a magnetic track.

It is another object of this invention to provide a compact, rugged and economical magnetic transducer for recording successive bits of a coded word simultaneously in successive areas along a magnetic track.

More specifically, it is an object of this invention to provide a unitary multibit magnetic record transducer for simultaneously recording a plurality of bits of information in successive bit positions, respectively, along the direction of movement of a magnetic track.

In accordance with the present invention, these and other objects are attained in a single magnetic record transducer having a plurality of parallel and closely-spaced signal translating gaps for recording concurrently-received bits of information in serial order along a magnetic track. The transducer comprises a plurality of leg members of magnetic material arranged in a substantially fan-like structure. One end of each leg member joins at the vertex of the structure to form, in conjunction with adjacent leg members, the plurality of signal translating gaps. Individual signal translating windings for each gap are located between each adjacent pair of leg members at the other end of the structure.

For recording purposes, the plurality of signal translating gaps are situated adjacent a magnetic track which moves in a direction perpendicular to the line, or width, of the individual gaps. Thus, a plurality of signals respectively applied to the individual signal translating windings may be recorded simultaneously in successive areas along the direction of movement of the magnetic track. This recordation is accomplished advantageously without requiring intermediate storage or conversion circuitry, and permits all of the bits of a multibit word to be recorded simultaneously on a single magnetic track.

An embodiment, according to the present invention, may include n leg members of magnetic material disposed in a fan-like arrangement to define n—1 signal translating gaps. Signals to be recorded on a magnetic track moving adjacent to the gaps are applied to n—1 signal translating coils positioned between the leg members and respectively associated with the gaps defined by the leg members. Thus, each of the n leg members, except for the outside two, forms a part of the magnetic recording circuit of two distinct signal translating gaps. For example, in two-level magnetic recording, each leg member except for the outside two may define the north pole tip of one signal translating gap, and simultaneously may define the south pole tip of another signal translating gap.

It is therefore a feature of this invention that a magnetic record transducer comprise a plurality of leg members of magnetic material arranged to form a plurality of parallel signal translating gaps and circuitry for energizing the gaps including individual signal translating coils positioned between each adjacent pair of the leg members.

Another feature of this invention relates to a multibit record transducer comprising a plurality of magnetic leg members each of which defines a portion of more than one magnetic recording circuit.

More specifically, it is a feature of this invention that a magnetic record transducer comprise a plurality of leg members, each leg member defining the north pole tip of a first signal translating gap and defining simultaneously the south pole tip of a second signal translating gap.

A still further feature of this invention relates to the method for manufacturing multibit magnetic record transducers comprising positioning a plurality of magnetic members in a fan-like arrangement, forcing the members into juncture, impregnating the portion of the members forming the juncture in a self-setting resin, shaping the resin and the portion of the members forming the juncture to define a plurality of signal translating gaps, and positioning energization circuitry between adjacent members.

These and other objects and features of this invention will be better understood upon consideration of the following detailed description and the accompanying drawing, in which.

Figure 1:
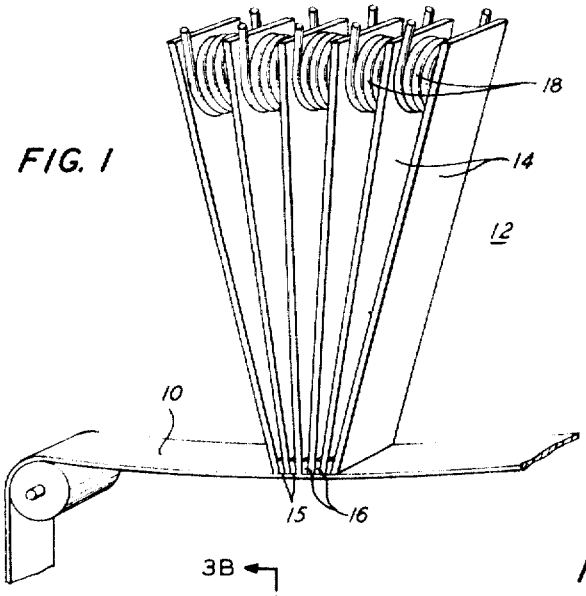
FIG. 1 is a representation of an illustrative embodiment in accordance with the principle of my invention.

Referring more particularly to FIG. 1 of the drawing, a record transducer 12 in accordance with the principles of my invention is shown comprising a plurality of leg members 14 of magnetic material disposed in a fan-like V-shaped arrangement. One end of each of leg members 14 joins at the vertex of the V-shaped arrangement to define a plurality of signal translating gaps 15. Individual signal translating windings 18 associated with each signal translating gap 15 are located between adjacent pairs of leg members 14 at the open end of the V-shaped arrangement. A suitable shim or spacer 16 may be inserted between adjacent leg members 14, as shown in FIG. 1, for shielding purposes and to provide accurate and substantially equal gap spacing.

The particular illustrative embodiment shown in FIG. 1 comprises six leg members 14 arranged to define five parallel signal translating gaps 15. Five signal translating windings 18 are individually associated with gaps 15 and are located between the respective pairs of leg members 14 defining gaps 15. Leg members 14 may be of any of the well-known magnetic materials suitable for magnetic recording purposes; and they should be relatively small in width, i.e., the dimension along the length of magnetic track 10, to provide a compact transducer with closely-spaced gaps. For example, leg members 14 constructed of 4 mil 4 Mo Permalloy may be employed advantageously in the embodiment of FIG. 1 to define five signal translating gaps of 0.5 mil each in a total length along track 10 of approximately 26.5 mil.

For recording purposes, as discussed more fully hereinbelow, the plurality of parallel signal translating gaps defined by the leg members 14 are situated adjacent a magnetic track 10 which moves in a direction perpendicular to the lines of the individual gaps. The line of the gap, sometimes referred to as the width of the gap, is considered herein to be the dimension of the gap measured into the drawing in FIG. 1; i.e., the dimension coincident with the width of magnetic track 10. Thus, as magnetic track 10 moves longitudinally, a given point thereon moving adjacent record transducer 12 passes each of the plurality of signal translating gaps 15 in succession, separate and distinct areas of track 10 being adjacent each of the gaps at any given instant of time. Therefore, signals respectively applied to individual signal translating windings 18 act to energize gaps 15 associated therewith to effect simultaneous recordation of the signals in successive areas along the direction of movement of magnetic track 10.

Figure 2:
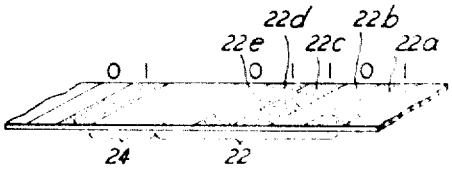
FIG. 2 is a representation of a portion of the magnetic track of FIG. 1.

For example, recordation of the binary word 10110 is illustrated in FIG. 2 by information block 22 on a portion of magnetic track 10 from FIG. 1. Individual bit signals for each of the five bits of information in the binary word to be recorded are applied simultaneously to respective ones of windings 18 of record transducer 12 to energize respective ones of gaps 15 in accordance therewith. The separate and discrete areas of magnetic track 10 adjacent gaps 15 at this time, i.e., bit positions 22a through 22e, respectively, are simultaneously magnetized thereby in accordance with the input bits of information. As is apparent from the parallel orientation of signal translating gaps 15 to magnetic track 10 in FIG. 1, the recordation of the bits of information is effected through longitudinal magnetization of the respective areas of track 10 adjacent gaps 15. By way of illustration, therefore, a binary "1" may be recorded by longitudinally magnetizing a portion of track 10 in one direction; and a binary "0" may be recorded by longitudinally magnetizing a portion of track 10 in the other direction, or by the absence of magnetization. A guard space 24 may be left between adjacent information blocks, as shown in FIG. 2.

Figure 3A:
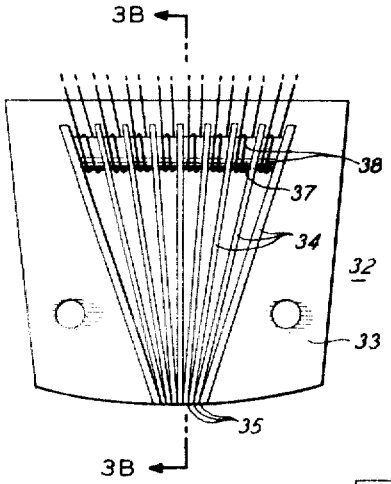
FIG. 3A is a representation of another illustrative embodiment of my invention.
Figure 3B:
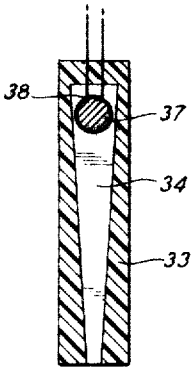
FIG. 3B is a cross-sectional view of a portion of FIG. 3A.

FIGS. 3A and 3B illustrate another embodiment of my invention showing a record transducer 32 comprising nine magnetic leg members 34 disposed in a fan-like arrangement to define eight signal translating gaps 35. Individual signal translating windings 38 are located on respective magnetic cores 37 positioned between adjacent pairs of leg members 34. As shown in FIG. 3B, the cross-sectional area of leg members 34 may be greater advantageously in the area adjacent windings 38 than at the ends defining gaps 35 to permit the use of lower writing currents. The transducer apparatus thus described is set in a resin material 33 and molded to the desired shape.

Figure 3C:
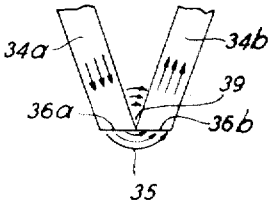
FIG. 3C is an enlarged view of a portion of FIG. 3A.

An enlarged view of a portion of FIG. 3A is shown in FIG. 3C to illustrate a typical magnetic flux recording path through a pair of adjacent leg members 34a and 34b, and across signal translating gap 35. It will be noted that the individual leg members need not be physically separated, but advantageously may be in contact such as shown at 39 in FIG. 3C, signal translating gap 35 being defined by the flux path between adjacent pole tips 36a and 36b of leg members 34a and 34b, respectively. Of course, as illustrated in FIG. 1, the ends of the leg members may be separated by suitable spacing means to define a greater gap spacing when desired.

The structural features of my invention can be more fully understood after a description of a preferred procedure for manufacturing a multibit magnetic record transducer, such as the embodiment shown in FIGS. 3A and 3B. The individual leg members 34 are composed of magnetic material and are preferably of substantially similar design and structure, with the possible exception of the outside two leg members. These two leg members may be of greater thickness than the outer leg members to provide support and facilitate assembly during the manufacturing procedure. The ends of leg members 34 which are to join to define signal translating gaps 35 should be substantially square and of the same width.

A suitable jig or fixture is employed to position the desired plurality of leg members in a fan-like, V-shaped arrangement. Each leg member 34 is equally spaced from adjacent leg members and should be held in a manner which permits longitudinal movement of the individual leg member 34. Mechanical pressure is exerted at one end of each of leg members 34, longitudinally along the leg member, whereby the other ends of the leg members are forced into juncture at the vertex of the V-shaped arrangement. Advantageously, the pressure should be sufficient to cause the ends meeting at the vertex to bend slightly in an outward direction at the juncture. It should be noted that if shims are desired between adjacent members they will be inserted at this point before pressure is exerted on the leg members.

The next step in the procedure is to impregnate the ends of leg members 34 meeting at the vertex of the V-shaped arrangement in a self-setting synthetic resin material, while maintaining the pressure at the other end of each of leg members 34. Thus when the resin hardens and sets, it bonds this portion of the leg members together, and they may be removed from the jig for the rest of the assembly procedure. Individual signal translating windings 38 are positioned next between each adjacent pair of leg members 34. If desired, the windings 38 may be placed first on individual magnetic cores 37, as shown in FIGS. 3A and 3B, and then positioned between leg members 34. The number of turns and the gauge of the wire employed will depend, of course, upon the electrical characteristics desired.

Following positioning of windings 38, the transducer assembly is ready for a setting and molding operation. Suitable mold parts are arranged to give the transducer the desired shape, and a self-setting resin is applied to impregnate the entire transducer assembly. It may be necessary during the molding operation to apply mechanical pressure to the outside two leg members along a line coincident with the axis of cores 37 to force the parts together until the resin hardens and sets, bonding the transducer assembly into a compact, unitary structure. The terminal ends of windings 38 are left exposed during the molding operation to provide for subsequent connection thereto for recording purposes. To finish the transducer structure after the resin hardens, the ends of leg members 34 joining at the vertex of the V-shaped arrangement are subjected to grinding, lapping and polishing operations to expose the pole tips to define the plurality of signal translating gaps 35, such as shown in FIGS. 3A and 3C, and to provide an arcuate surface for contact with the magnetic track.

A multibit magnetic record transducer constructed in accordance with the assembly procedure described above has many desirable features. The transducer can be manufactured with considerable uniformity on a quantity basis. The assembly procedure facilitates the accurate parallel alignment of the plurality of signal translating gaps and accurately locates these gaps with respect to the surface in contact with the magnetic track. Moreover, the assembly procedure is fast, simple and economical, and minimizes the effect of the human factor upon the quality of the furnished transducer.

Figure 4:
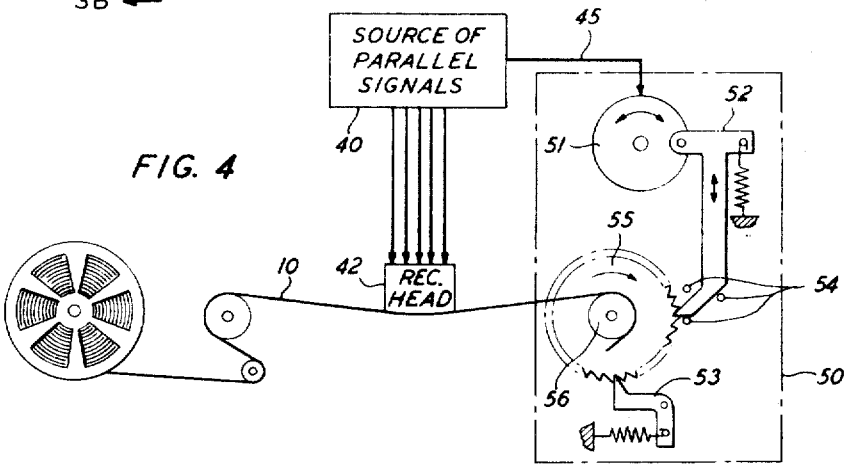
FIG. 4 is a block diagram of an illustrative recording system employing a record transducer in accordance with the principles of my invention.

As mentioned above, a mulibit magnetic record transducer in accordance with the principles of my invention may be employed advantageously in recording systems wherein coded words, in the form of a plurality of parallel bits of information, are presented to be recorded in serial order on a single magnetic track. The relative motion between the magnetic track and the record transducer may be at a constant rate, or the motion may be intermittent for a particular application. Where the coded words are presented at a relatively slow or uneven rate for recordation, e.g., when produced by teletypewriter apparatus, it is usually desirable to advance the recording track intermittently, rather than at a constant speed, in accordance with the words to be recorded. Such an exemplary recording system is illustrated in FIG. 4. A recording head 42 comprising a multibit record transducer in accordance with my invention is situated adjacent a single magnetic track 10 such that the plurality of signal translating gaps thereof are in contact with track 10. The inputs associated with the respective gaps of recording head 42 are connected to a source of parallel signals 40, which may include any source presenting parallel signals to be recorded serially on track 10; e.g., the teletypewriter apparatus mentioned above.

Track 10 moves longitudinally from left to right in FIG. 4 along a path adjacent recording head 42 under the control of driving apparatus 50, which comprises rotary solenoid 51, driving pawl 52, locking pawl 53, gear 55 and driving capstan 56. Control lead 45 connects driving apparatus 50 to the source 40 to control the application of driving energy to track 10 in accordance with the presentation of signals to be recorded. Thus the operation of driving apparatus 50 is such that a control signal on lead 45 energizes rotary solenoid 51 to rotate from a rest position counterclockwise through a predetermined angular displacement. Driving pawl 52, pivotally connected to solenoid 51, is urged upward, guided by pins 54, into engagement with a tooth on gear 55. Deenergization of solenoid 51 permits it to return to the rest position urging driving pawl 52 downward to advance gear 55 through a predetermined angle of rotation. Capstan 56, rigidly connected to gear 55, is advanced thereby through the same angle of rotation to impart a corresponding longitudinal motion to track 10. Locking pawl 53 prevents the counterclockwise rotation of gear 55, and thus of driving capstan 56.

Therefore, a plurality of bits of information, e.g., a binary word, applied to recording head 42 by source 40 may be simultaneously recorded in respective positions along track 10, while track 10 is temporarily stationary. Then before the application of subsequent bits of information to recording head 42, track 10 is longitudinally advanced through a predetermined distance via driving apparatus 50, energized by a control signal on lead 45. The control signal on lead 45 may be derived advantageously from the signals applied to recording head 42, particularly in applications where the lead bit of each binary word is of the same binary character. Thus the bits of information will be recorded in successive blocks along track 10, which may be separated by a guard space such as shown in FIG. 2. Subsequent reproduction of the recorded information for utilization may be accomplished via a conventional single-gap reading head, the magnetic track moving adjacent thereto at a constant speed.

What is disclosed hereinabove, therefore, is the novel structure and manufacturing procedure for a magnetic record transducer comprising a plurality of leg members arranged to define a plurality of parallel signal translating gaps and circuitry for energizing the gaps to record concurrently presented bits of information in serial order along a magnetic track.

It is to be understood that the above-described arrangements are illustrative of the application of the principles of the invention. Numerous other arrangements may be devised by those skilled in the art without departing from the spirit and scope of this invention.

What is claimed is:

1. A magnetic record transducer for recording a plurality of bits of information along a magnetic track comprising n leg members [of magnetic material], where n is greater than two, *said leg members comprising individual substantially elongated elements of magnetic material,* [means for] *nonmagnetic material disposed between adjacent ones of said leg members, said nonmagnetic material* positioning said leg members to define n−1 signal [translating] *recording* gaps along said track, and [means] *individual signal translating windings positioned between adjacent ones of said leg members* for energizing individual of said signal translating gaps, *said leg members being spaced apart a greater distance adjacent said windings than adjacent said gaps.*

[2. A magnetic record transducer in accordance with claim 1 wherein said energizing means comprises n−1 signal translating windings individually positioned between each adjacent pair of said leg members.]

[3. A magnetic record transducer in accordance with claim 2 wherein at least n−2 of said leg members are substantially identical in structure.]

4. A magnetic record transducer in accordance with claim [2] *1* wherein said leg members [are spaced apart a greater distance adjacent said windings than remote from said windings to] *define a substantially fan-like structure.*

5. A magnetic record transducer in accordance with claim [2] *1* wherein the cross-sectional area of said leg members is greater adjacent said windings than adjacent [remote from ] said *gaps* [windings].

6. A magnetic record transducer in accordance with claim [2] *1* and further comprising spacing members intermediate corresponding ends of adjacent leg members remote from said windings.

7. A transducer for recording a plurality of distinct *digital* signals simultaneously in successive areas along a magnetic track, said transducer comprising n *indivdual substantially elongated leg* members of magnetic material, *where n is greater than two,* [means for] *nonmagnetic material disposed between adjacent ones of said leg members, said nonmagnetic material* positioning said members to define n—1 magnetic flux paths, said paths being aligned with said track for longitudinal recording thereon, individual [energization means] *signal translating windings* associated with each of said paths, and means for [magnetically coupling signals applied to said individual energization means to respective ones of said magnetic members] *positioning said windings between each adjacent pair of said leg members, said leg members being spaced apart a greater distance adjacent said windings than remote from said windings,* whereby [said] signals *applied to said windings* are provided to said paths for recording along said track.

8. A magnetic record transducer having a plurality of parallel signal translating gaps adjacent a single magnetic track, said transducer comprising a plurlity of *individual substantiated elongated leg* members of magnetic material each having a fixed end and a free end, *nonmagnetic* means for positioning said free ends of said leg members to define said signal translating gaps, and means for energizing said gaps comprising individual signal translating coils positioned between said fixed ends of each adjacent pair of said leg members, *said fixed ends of said leg members being spaced apart a greater distance than said free ends.*

[9. In a recording system for recording a plurality of concurrently-received signals in serial order on a magnetic track, a record transducer comprising a magnetic structure having a plurality of parallel recording gaps adjacent said track, means for moving said track across said gaps in a direction substantially perpendicular to the width of said gaps, individual energization means associated with each of said gaps, and means for applying said signals to respective ones of said individual energizaton means.]

[10. In a recording system for simultaneously recording the digits of a multiple digit binary number on a magnetic track movable along a path, a plurality of closely-spaced signal translating gaps situated along the path of movement of said track and aligned for longitudinal recording on said track, a plurality of signal translating windings corresponding to the digits of the binary number, each of said gaps being energized in response to a digit signal applied to an associated one of said windings, means for applying digit signals to corresponding ones of said windings in accordance with said binary number, and means actuated by said signal for moving said track along said path.]

11. In a record transducer for simultaneously recording a plurality of bits of information in a single channel of a magnetic medium, a plurality of *individual substantially elongated* leg members of magnetic material each having a first end and a second end, *nonmagnetic* means for positioning the first ends of said leg members to define a plurality of parallel signal translating gaps, a plurality of magnetic core members individually positioned between the second ends of adjacent ones of said plurality of leg members, *said second ends of said leg members being spaced apart a greater distance than said first ends,* and *coil* means coupled to said magnetic core members for selectively energizing respective ones of said plurality of signal translating gaps.

12. In a record transducer, the combination in accordance with claim 11 wherein the cross-sectional area of said first ends of said leg members is smaller than the cross-sectional area of said second ends of said leg members.

13. In a record transducer for simultaneously recording a plurality of bits of information in a single channel of a magnetic medium, a plurality *greater than two* of *individual substantially elongated leg* members of magnetic material, *nonmagnetic* means for positioning said leg members to define a plurality of signal translating gaps, magnetic recording circuit means positioned between adjacent ones of said plurality of leg members for defining a magnetic recording path through each pair of said adjacent leg members, *said leg members being spaced apart a greater distance adjacent said magnetic recording circuit means than adjacent said gaps,* each of said leg members being a part of at least two magneitc recording paths, means for positioning said plurality of signal translating gaps adjacent said single channel of said magnetic medium, and *coil* means for individually energizing said magnetic recording circuit means.

References Cited

The following references, cited by the Examiner, are of record in the patented file of this patent or the original patent.

UNITED STATES PATENTS

| | | | |
|---|---|---|---|
| 3,159,822 | 12/1964 | Hagopian | 340—174.1 |
| 3,275,995 | 9/1966 | Hagopian | 340—174.1 |
| 2,918,812 | 12/1959 | Rettinger | 179—100.2 |
| 3,049,790 | 8/1962 | Camras | 179—100.2 |
| 3,085,246 | 4/1963 | Cowden | 179—100.2 |
| 2,785,038 | 3/1957 | Ferber | 346—74 |
| 2,831,058 | 4/1958 | Finch | 340—347 |
| 2,856,256 | 10/1958 | Carman | 346—74 |
| 2,915,597 | 12/1959 | Wanlass | 179—100.2 |
| 3,012,104 | 12/1961 | Kleis | 179—100.2 |
| 3,103,665 | 9/1963 | Martin | 346—74 |

FOREIGN PATENTS

| | | |
|---|---|---|
| 919,434 | 10/1954 | Germany. |

JAMES W. MOFFITT, Primary Examiner

V. P. CANNEY, Assistant Examiner

U.S. Cl. X.R.

340—174.1